J. C. CROMWELL.
BEARING.
APPLICATION FILED MAR. 9, 1905. RENEWED FEB. 13, 1908.
1,053,715.
Patented Feb. 18, 1913.
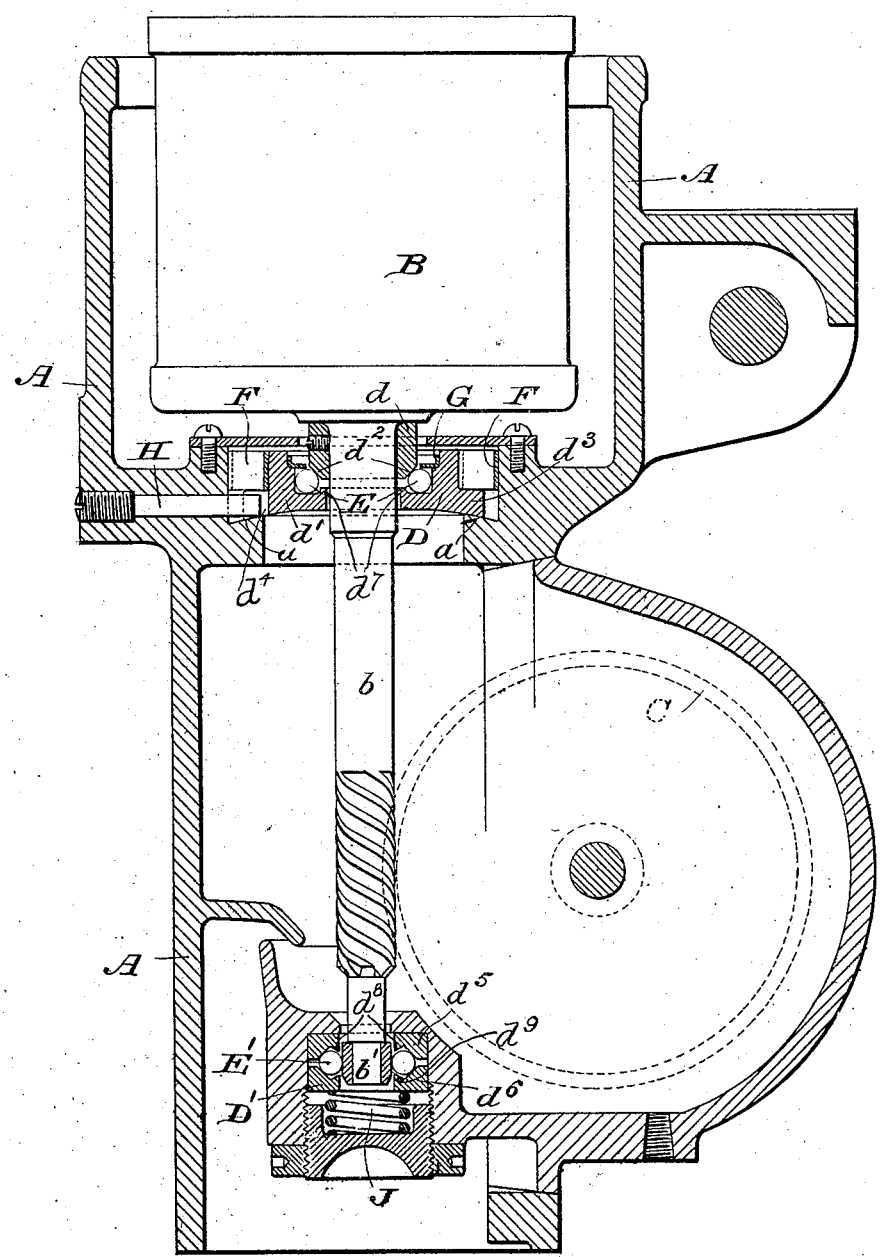
WITNESSES:
D. Davies
G. W. Saywell
INVENTOR:
John C. Cromwell
by his attorney
J. D. Fay

UNITED STATES PATENT OFFICE.

JOHN C. CROMWELL, OF CLEVELAND, OHIO.

BEARING.

1,053,715. Specification of Letters Patent. Patented Feb. 18, 1913.

Application filed March 9, 1905, Serial No. 249,215. Renewed February 13, 1908. Serial No. 415,669.

*To all whom it may concern:*

Be it known that I, JOHN C. CROMWELL, a citizen of the United States, residing at Cleveland, in the county of Cuyahoga and State of Ohio, have invented a new and useful Improvement in Bearings, of which the following is a specification.

My invention relates to an improvement in "bearings" for rotating shafts and journals and is especially adapted for shafts and journals to which is imparted a longitudinal thrust, and which are, due to their rapid rate of vibration or lack of perfect balance in the load or unevenness in the application of the motive power, subject to strains tending to displace them laterally or to cause them to oscillate. Such shafts are frequently called self-centering by reason of the fact that they are frequently provided with means to automatically return them to the center when they have been displaced, though this term self-centering has been loosely used to designate shafts which are intended to have freedom of movement under strain, but which have not been provided with any means for returning them to the center. My bearing is, as above stated, applicable to shafts and journals to which it is desired to allow this flexibility of action, regardless of whether they are provided with positive centering means or not and will automatically maintain all of the balls in engagement with the raceway and the shaft at all inclinations of the shaft relative to the transverse plane of the bearing.

The advantages of the principles underlying my improved mechanism are clearly set forth in the following specification, reference being had to the accompanying drawings which illustrate an embodiment of my invention.

The accompanying drawings referred to represent a vertical section of a portion of a centrifugal separator in which the bowl-shaft is mounted in accordance with the principle of my broad invention, two specific forms of bearings being set forth in this specification. One of these bearings I desire to claim specifically in connection with this present application, which is also directed to the broad invention, the other of which bearings I have described and claimed in United States Patent No. 856,228, granted June 11th, 1907.

The broad invention, which is capable of use in many structures, is particularly adapted for the mounting of bowl shafts for centrifugal separators, and the specific form of bearing herein claimed is likewise suitable for such uses, since, in such apparatus, the highest speeds are obtained or sought to be obtained, and the slightest deviation from perfect balance of the load will cause the shaft to tend to oscillate in the most marked manner, and cause it to cramp its bearings and buckle out of shape, unless bearings are employed which permit flexibility of movement on the part of the shaft, or its displacement out of its normal axial line. This tendency is further accentuated and at the same time complicated by a sidewise thrust or pull of the power transmitting mechanism. The conditions therefore obtained in centrifugal separators are such as have hitherto rendered it practically impossible to simultaneously use anti-friction bearings and allow for the oscillation and sidewise shifting of the shaft so that it would be possible to permit the disturbing strains to be counteracted without distortion of the shaft or cramping of the bearings. I have, however, conceived and produced a form of anti-friction bearing for the shaft or journal, and a structure by which the shaft or journal may be mounted in the said bearing, so that it will be free to tilt therein and permit oscillation of the shaft outside of the bearing, and will also permit of actual lateral shifting of the shaft at the zone where it contacts with the said bearing.

Carried in the frame A of a centrifugal separator of any approved type, is a separating bowl B, to which a rapid rotary motion is given by means of the worm-wheel C gearing with the shaft $b$ of the separating bowl and with the driving mechanism (not shown). During the rapid rotation of the bowl B both it and the shaft $b$ vibrate considerably, and this is especially true when the speed at which the separator is balanced to run is changed materially, as is the case in starting up the machine.

I have provided two flexible ball-bearings D and D' for the reception and guidance in the frame A of the two ends of the shaft $b$, such bearings being so arranged as to properly take care of the vibrations of the bowl B and not in any way disturb the paths of travel of the balls. The vibrations of the bowl B and the shaft $b$ above referred to serve to distort both of the bearings D and D', and it is my object to so arrange said bearings that they will mutually compensate for the distortions of each other and thus maintain centralization between the axes of said bearings and the separating bowl. And, it is further my object to provide such a structure in the bearing D so that it shall have functions and a utility not had by any of the bearings heretofore known in the art.

Referring now to the upper bearing D, it will be seen that in the present instance I employ as the bearing portion for the shaft the upper annular sleeve-like member $d$ surrounding the shaft $b$ to which it is revolubly fixed and having a spherical or convex surface $d^2$ adapted to contact with the balls E carried in the race formed in a lower member $d'$ which will now be described in detail. This lower member $d'$ is an annular ring carried by means of a flange $d^3$ upon a guiding and supporting shoulder $a$ of the frame and is adapted to sustain the whole weight of the separating bowl B. Considerable lateral play is allowed the member $d'$ upon the shoulder $a$, as will be clearly seen from the drawing, so that the shaft and bearing may accommodate themselves to all swayings and vibrations induced in the separating bowl by the operation of the machine. The flange $d^3$ and shoulder $a$ are provided with juxtaposed complementary curved surfaces formed into parts of the surface of a sphere of which so much of the shaft $b$ as lies below the member $d'$, is a radius, so that, as the bowl and shaft sway, the flange $d^3$ oscillates over the arc on the shoulder $a$ and there is very little friction between it and said shoulder. In order that the oscillation of the laterally-movable member $d'$, reinforced as it is by the weight of the bowl B, may not react upon the frame A, a compensating resilient ring F, shown in the drawing as an annular, corrugated spring-steel ring, is interposed between said member $d'$ and the frame, and acts as a cushion or buffer between the same, taking up the movements of the member $d'$ without communicating the same to the frame. The bearing is self-containing for the balls E, even when the member $d$ of the bearing is removed, since the lower member $d'$ of the bearing is provided with a retaining lip $d^7$ which, in coöperation with a removable annular ring G adapted to form a second retaining lip, holds the balls in place, and prevents the escape of the same from their ball-race. It is obvious that many suitable equivalents of the retaining ring G, such as removable plugs riveted into the lower member $d'$, might be provided which would coöperate with the lip $d^7$ to render said member $d'$ self-containing for the balls. This feature is especially serviceable when the separator is dismantled for cleansing and other purposes.

A pin H, screwed in through the frame A from the outside, engages a suitable notch $d^4$ in the flange $d^3$ and prevents the member $d'$ from rotating upon the shoulder $a$. The balls E are prevented from climbing by the annular ring G, as clearly indicated in the drawing. It is obvious that in adaptations of the bearing D to uses other than that of utilizing it in a centrifugal separator, suitable equivalents of the shoulder $a$, over which the bearing oscillates, may be provided, said shoulder being shown in this application of the bearing as an integral part of the separator frame.

The lower bearing D' comprises the two annular parts $d^5$ and $d^6$ suitably carried and retained in the frame, and a third part, adapted to be revolved by the shaft which the bearing carries, and shown in the drawing as an integral part $b'$ of the shaft $b$, said part $b'$ being located centrally and symmetrically as regards the parts $d^5$ and $d^6$, and having a surface adapted to contact with the balls E' carried in the three-point ball-race formed by the members $d^5$, $d^6$ and $b'$. The parts $d^5$ and $d^6$ form one member of the bearing D' and the shaft portion $b'$ a second member, the parts $d^5$ and $d^6$ being entirely distinct from one another and capable of movement and adjustment relatively to each other, such movement and adjustment being automatically controlled as will be hereinafter explained. Said parts $d^5$ and $d^6$ alone are adapted to form a self-containing two-point ball-race, as hereinafter explained, and are grooved to receive between them the balls E' as shown, and the inner surfaces of these grooves slope so that they force the balls against the member $b'$ and tend to center the latter. The parts $d^5$ and $d^6$ are forced apart by the member $b'$ thrusting against the balls E' when said member $b'$ moves one way or the other, due to the lateral vibrations of the shaft $b$ and the bowl B. This relative movement of the parts $d^5$ and $d^6$ compresses a spring J, suitably seated in the frame under the bearing D'. The tension of this spring J, as soon as the lateral thrust of the member $b'$ is relieved, automatically forces the parts $d^5$ and $d^6$ together again, and the sloping inner surfaces of these parts, forming the wedge-shaped ball-race within which the balls E' are supported, force said balls against the member $b'$, tending to center the latter as noted above. It will be noted that the parts $d^5$ and $d^6$ form in effect a ball-race for the balls E', which is variable in size, depending upon the amount of relative movement of said parts, which in turn is dependent upon the force of the lateral thrust of the revoluble member $b'$.

The lower bearing D' is self-containing for the balls E', even when the member $b'$ of the bearing is removed, since the retaining lips $d^8$ $d^9$ provided upon the parts $d^5$ $d^6$, respectively, prevent the escape of the balls from the two-point ball-race. As noted above in connection with the retaining lip $d^7$ and an annular ring G of the upper bearing D, this feature is especially serviceable when the separator is dismantled for cleansing and other purposes. This lower bearing D' carries none of the weight of the bowl and shaft but serves only to steady the latter and to compensate for the distortions of the upper bearing D.

Having described my invention in detail, that which I particularly point out and distinctly claim is:

1. A mounting for a vertical shaft, comprising a self-centering supporting bearing arranged near the upper end of the shaft, a load carried by the shaft above said supporting bearing, and a bearing arranged near the lower end of the shaft, the self-centering supporting bearing carrying the load and permitting the upper portion of the shaft to move sidewise in self-centering, and the lower bearing holding the lower end of the shaft against excessive sidewise movement while permitting it to move to adjust itself to the movement of its upper end; substantially as described.

2. A mounting for a vertical shaft, comprising a self-centering ball-bearing arranged near the upper end of the shaft and supporting the load, said load being carried by the shaft above such bearing, and a lower bearing which holds the lower portions of the shaft without supporting the load and which permits the shaft to move in accordance with the movements of the upper bearing; substantially as described.

3. A mounting for a vertical shaft comprising a self-centering supporting-bearing arranged near the upper end of the shaft, a load carried by the shaft above said supporting-bearing, and a bearing arranged near the lower end of the shaft, the self-centering supporting-bearing carrying the load and permitting the upper portion of the shaft to move sidewise in self-centering, and the lower bearing holding the lower portion of the shaft against sidewise movement.

4. A mounting for a vertical shaft comprising a self-centering ball-bearing arranged near the upper end of the shaft and supporting the load, a load attached to the shaft above said supporting-bearing, and a lower bearing which holds the lower portion of the shaft against sidewise movement without supporting the load.

5. A mounting for a vertical shaft carrying the load at its upper end, such mounting comprising a self-centering ball-bearing which supports the load and is arranged near the upper end of the shaft below the load, said supporting-bearing being capable of tilting in its support and the shaft being capable of tilting in the bearing and of moving sidewise in finding its natural axis of rotation.

Signed by me, this 28" day of February, 1905.

JOHN C. CROMWELL.

Attested by—
D. T. DAVIES,
G. W. SAYWELL.

---

Copies of this patent may be obtained for five cents each, by addressing the "Commissioner of Patents, Washington, D. C."